(12) United States Patent
Peng et al.

(10) Patent No.: US 11,073,746 B2
(45) Date of Patent: Jul. 27, 2021

(54) IMAGE-CAPTURING ASSEMBLY

(71) Applicant: LUXVISIONS INNOVATION LIMITED, New Territories (HK)

(72) Inventors: Kuo-Hao Peng, New Territories (HK); Shang-Chieh Chien, New Territories (HK); Yao-Chung Chang, New Territories (HK)

(73) Assignee: GUANGZHOU LUXVISIONS INNOVATION TECHNOLOGY LIMITED, Science (CN)

( * ) Notice: Subject to any disclaimer, the term of this patent is extended or adjusted under 35 U.S.C. 154(b) by 0 days.

(21) Appl. No.: 16/670,670

(22) Filed: Oct. 31, 2019

(65) Prior Publication Data

US 2020/0142281 A1 May 7, 2020

Related U.S. Application Data

(60) Provisional application No. 62/754,189, filed on Nov. 1, 2018.

(30) Foreign Application Priority Data

Oct. 2, 2019 (TW) .................................. 108135767

(51) Int. Cl.
*G03B 17/12* (2021.01)
*G03B 11/00* (2021.01)
*H04N 5/225* (2006.01)
*G03B 13/34* (2021.01)

(52) U.S. Cl.
CPC .............. *G03B 17/12* (2013.01); *G03B 11/00* (2013.01); *G03B 13/34* (2013.01); *H04N 5/2253* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| 2005/0275746 | A1* | 12/2005 | Nishida | H01L 27/14618 348/360 |
| 2008/0297645 | A1* | 12/2008 | Lo | H01L 27/14625 348/340 |
| 2009/0033790 | A1* | 2/2009 | Lin | G02B 7/023 348/374 |
| 2011/0261253 | A1* | 10/2011 | Chang | H04N 5/2257 348/374 |
| 2015/0346404 | A1* | 12/2015 | Bak | H04N 9/04553 348/342 |
| 2015/0372037 | A1* | 12/2015 | Tomeba | H04N 5/2257 257/432 |

(Continued)

*Primary Examiner* — William B Perkey
(74) *Attorney, Agent, or Firm* — Birch, Stewart, Kolasch & Birch, LLP

(57) ABSTRACT

An image-capturing assembly includes a circuit board, an optical filter, an image-capturing element between the circuit board and the optical filter, and a holder. The holder includes a fixing portion. The image-capturing element is on the circuit board and electrically connected to the circuit board. The holder is on an external side of the image-capturing element. The fixing portion has an upper surface and a lower surface opposite to each other, and the lower surface is fixed on the circuit board. The optical filter is fixed on the upper surface of the fixing portion.

4 Claims, 16 Drawing Sheets

(56) References Cited

U.S. PATENT DOCUMENTS

| | | | |
|---|---|---|---|
| 2016/0150136 A1* | 5/2016 | Chen | H04N 5/2254 |
| | | | 348/373 |
| 2018/0374885 A1* | 12/2018 | Decker | H04N 5/2253 |
| 2020/0007726 A1* | 1/2020 | Wang | H04N 5/2253 |
| 2020/0142281 A1* | 5/2020 | Peng | G03B 17/02 |
| 2020/0387049 A1* | 12/2020 | Kimura | G03B 3/10 |
| 2020/0412923 A1* | 12/2020 | Hsu | H04N 5/2257 |

\* cited by examiner

IMAGE-CAPTURING ASSEMBLY

CROSS-REFERENCES TO RELATED APPLICATIONS

This application claims the priority benefit of U.S. provisional application Ser. No. 62/754,189, filed on Nov. 1, 2018 and Patent Application No. 108135767 filed in Taiwan, R.O.C. on Oct. 2, 2019. The entirety of the above-mentioned patent applications are hereby incorporated by references herein and made a part of the specification.

BACKGROUND

Technical Field

The present invention relates to an image-capturing assembly, and in particular, to an image-capturing assembly applicable to a portable device.

Related Art

With the development of science and technology and the progress of the times, people have increasingly higher requirements on portable devices. The most significant evolution is the improvement of panel specifications of the devices, including changes in the size, resolution and module thickness, which all directly affect the appearance of a product.

Using a mobile phone as an example, functions of the mobile phone are no longer limited to communication. Nowadays, common mobile phone functions include music playing, internet surfing, mobile TV and image capturing. Therefore, module specifications of the mobile phone are gradually developed to meet the requirements of a large size and a high resolution.

A large size means an increase in the weight, which does not comply with the requirements of being portable and thin and light of the portable devices, such as mobile phones, in the current society. However, if the devices meet the requirement of being thin and light, internal spaces of the devices become insufficient.

SUMMARY

Accordingly, to resolve the problem of an insufficient internal space of a device, the present invention relates to an image-capturing assembly. Different elements of the image-capturing assembly are reconfigured and a configuration manner of the elements is improved, so that the overall thickness of the image-capturing assembly is reduced.

In an embodiment, an image-capturing assembly comprises a circuit board, an optical filter, an image-capturing element between the circuit board and the optical filter, and a holder including a fixing portion. The image-capturing element is on the circuit board and electrically connected to the circuit board. The holder is on an external side of the image-capturing element. The fixing portion has an upper surface and a lower surface opposite to each other, and the lower surface is fixed on the circuit board. The optical filter is fixed on the upper surface of the fixing portion.

In an embodiment, an image-capturing assembly comprises a metal plate, a circuit board having a hollow portion, an optical filter, and an image-capturing element in the hollow portion, the image-capturing element being between the metal plate and the optical filter. The circuit board is on the metal plate. The optical filter is on the circuit board. The image-capturing element is fixed on the metal plate.

In an embodiment, an image-capturing assembly comprises a circuit board having a recess, an optical filter, and an image-capturing element. The optical filter is on the circuit board. The image-capturing element is between the recess and the optical filter.

In an embodiment, an image-capturing assembly comprises a circuit board, an image-capturing element having an active area, a first adhesive layer, and an optical filter having an upper surface and a lower surface. The image-capturing element is on the circuit board. The first adhesive layer is on an external side of the active area of the image-capturing element. The optical filter is above the image-capturing element, and the lower surface of the optical filter is fixed on the first adhesive layer.

In conclusion, in the image-capturing assembly according to some embodiments of the present invention, arrangement positions of the image-capturing element, the optical filter, and the holder are changed, or fixing manners of the optical filter and the holder are changed, so as to reduce a distance between the optical filter and the image-capturing element and reduce the overall thickness of the image-capturing assembly, thus achieving the objective of making a portable device light and thin.

DETAILED DESCRIPTION

Figure 1A:
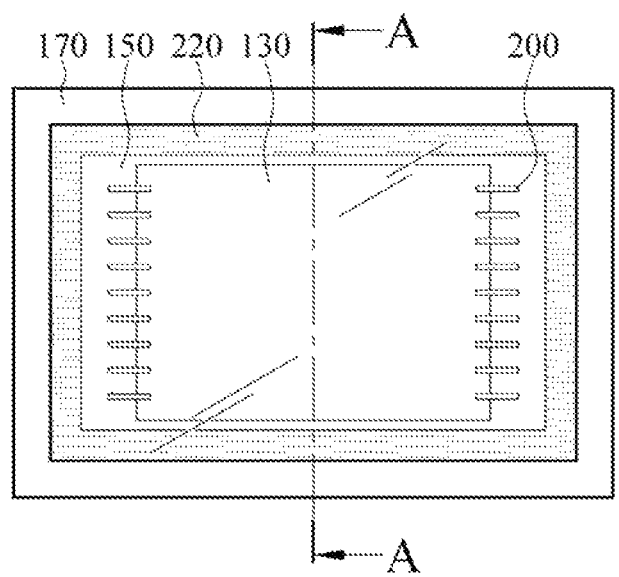
FIG. 1A is a schematic top view of an image-capturing assembly having an annular holder according to an embodiment of the present invention.

An image-capturing assembly 100 is applicable to a portable device, and is configured to capture a static or dynamic image. Common portable devices include a mobile phone, a camera, a notebook computer, a tablet computer, and the like. For example, the image-capturing assembly 100 includes elements such as a circuit board 110, an image-capturing element 130, an optical filter 150, a voice coil motor 180, and a lens 190.

In some embodiments, the image-capturing assembly 100 further includes a holder 170. For example, the holder 170 includes a fixing portion 171 configured to fix the optical filter 150. The holder 170 includes a carrying portion 173 configured to carry the voice coil motor 180. Alternatively, the holder 170 includes a fixing portion 171 and a carrying portion 173, which are configured to fix the optical filter 150 and carry the voice coil motor 180, respectively. In other embodiments, the holder 170 further includes a foot portion 175 configured to be fixed on the circuit board 110, to enhance the carrying stability and the overall mechanical strength.

In some embodiments, the image-capturing assembly 100 further includes a metal plate 500. The thickness of the metal plate 500 is less than that of the circuit board 110.

In some embodiments, the metal plate is a steel plate.

The circuit board 110 may be, but is not limited to, a printed circuit board (PCB), a flexible PCB, or a rigid flexible printed circuit board (RFPC). Moreover, in some embodiments, to meet requirements of the portable device, the circuit board 110 may be a planar circuit board 110, a step-shaped circuit board 110, a circuit board 110 with a hollow portion therein, or a circuit board 110 with a recess therein. The hollow portion is provided in and penetrates the circuit board 110. The recess is provided in but does not penetrate the circuit board 110. In other words, the recess has a bottom surface parallel to a lower surface of the circuit board 110.

The image-capturing element 130 is configured to convert an optical image signal inputted to the image-capturing element 130 into an electric image signal. The optical image signal is from the external of the portable device, passes through the lens 190 and the optical filter 150, and then enters an active area of the image-capturing element 130. The active area is an area for optical sensing. In some embodiments, the image-capturing element 130 is a complementary metal-oxide-semiconductor (CMOS) active pixel sensor or a charged coupled device.

Moreover, the image-capturing element 130 is electrically connected to the circuit board 110. In some embodiments, the image-capturing element 130 is electrically connected to an electric connection surface of the circuit board 110 through a wire 200. The wire is a gold wire, a silver wire, or a wire made of another metal material. The electric connection surface is coplanar or non-coplanar with an upper surface of the circuit board 110. In some embodiments, the wire 200 electrically connects the image-capturing element 130 and the circuit board 110 by means of wire bond. In some embodiments, the image-capturing element 130 is located on the circuit board 110, or located in the recess of the circuit board 110, or located in the hollow portion of the circuit board 110 and on the metal plate 500. In some embodiments, the electric connection surface is located on an external side of the hollow portion or the recess of the circuit board 110. For example, when the electric connection surface is located on the external side of the hollow portion or the recess of the circuit board 110 and is non-coplanar with the upper surface of the circuit board 110, the electric connection surface may be located in a plane with a step difference from the upper surface of the circuit board 110. Alternatively, the electric connection surface may be adjacent to a sidewall of the hollow portion or the recess of the circuit board 110.

The optical filter 150 is configured to filter the optical image signal that enters from the lens 190. In some embodiments, the optical filter is configured to allow visible light to pass and block invisible light. For example, a wavelength range of the visible light is usually 400 to 700 nm. That is, the optical filter 150 can allow light having a wavelength of 400 to 700 nm to pass and block the light having an optical wavelength beyond or below the range of 400 to 700 nm. In other embodiments, the optical filter 150 can allow visible light and partial infrared light to pass. In further other embodiments, the optical filter only allows infrared light to pass.

In some embodiments, the material of the optical filter 150 may be glass or plastics.

Moreover, the optical filter 150 is disposed corresponding to the image-capturing element 130, to be more specific, disposed corresponding to at least the active area of the image-capturing element 130, to avoid light leakage at the edge of the optical filter 150 which affects imaging. In some embodiments, the optical filter 150 is fixed on the holder 170, the circuit board 110, or an external side of the active area of the image-capturing element 13, and is close to an upper surface of the image-capturing element 130. The aforementioned term "close" means that an appropriate distance is maintained between the optical filter 150 and the image-capturing element 130. The appropriate distance may be, but is not limited to, a distance at which the optical filter 150 is not in contact with the image-capturing element 130, a distance at which the optical filter 150 is in contact with (that is, the distance is 0 mm) but does not apply a pressure on the image-capturing element 130, or a thickness of an adhesive layer 220 between the optical filter 150 and the image-capturing element 130. In some embodiments, a distance between the optical filter 150 and the image-capturing element 130 is 0.005 to 0.8 mm.

In some embodiments, the adhesive layer 220 is a polymer material with double-sided gum, for example, foam or rubber, so as to support and fix elements adjacent to the adhesive layer 220. Alternatively, an adhesive with a light blocking effect may be used, to reduce light entering the active area of the image-capturing element 130 from the adhesive layer 220. In another embodiment, the adhesive layer 220 is a general adhesive material, for example, an adhesive (such as a colloid), rubber, silica gel, plastics, or a combination thereof.

In still another embodiment, the adhesive layer 220 is thermosetting plastics or thermoplastics.

For example, the optical filter 150 is located above the image-capturing element 130 and is fixed on the holder 170. The optical filter 150 is fixed above the image-capturing element 130 by the adhesive layer 220, and the optical filter 150 is disposed corresponding to the active area of the image-capturing element 130. The adhesive layer 220 is located on the external side of the image-capturing element 130. Alternatively, when the image-capturing element 130 is located in the hollow portion or the recess of the circuit board 110, the optical filter 150 is located above the image-capturing element 130 and is fixed on the circuit board 110.

The holder 170 is located on the circuit board 110, and is disposed on an external side of the image-capturing element 130. In some embodiments, the fixing portion 171 and the foot portion 175 of the holder 170 are fixed on the circuit board 110 by using the adhesive layer 220. In some embodiments, the fixing portion 171 of the holder 170 is fixed on the circuit board 110 by using the adhesive layer 220, and the foot portion 175 is not fixed by using the adhesive layer 220. In implementation, considering the thickness of the adhesive layer 220, heights of the fixing portion 171 and the foot portion 175 of the holder 170 can be adjusted. In some embodiments, the quantity of holders 170 may be adjusted according to actual application. To be specific, there may be one or more than one holders 170.

In some embodiments, an upper surface of the carrying portion 173 of the holder 170 is coplanar or non-coplanar with an upper surface of the fixing portion 171 of the holder 170. For example, when the upper surface of the carrying portion 173 is coplanar with the upper surface of the fixing portion 171, the voice coil motor 180 is disposed on the co-plane and arranged to fit a side edge of the optical filter 150, or arranged to keep a distance from the side edge of the optical filter 150. Alternatively, when the upper surface of the carrying portion 173 is non-coplanar with the upper surface of the fixing portion 171, the upper surface of the carrying portion 173 is not lower than the upper surface of the fixing portion 171.

In some embodiments, the circuit board 110 includes a plurality of electronic elements 300. One of the electronic elements 300 is located between the carrying portion 173 of the holder 170 and the circuit board 110. A space is provided by a lower surface of the carrying portion 173 and the circuit board 110 to accommodate the electronic element 300 of the circuit board 110, thus reducing the overall height and volume of the image-capturing assembly.

In some embodiments, the holder 170 is an annular element having an opening, and the opening surrounds the image-capturing element 130. In other embodiments, the image-capturing element 130 has two opposite first side edges and two opposite second side edges, and the image-capturing assembly 100 includes two holders 170. The holders 170 are each a strip element and are located on the two first side edges respectively. In addition, in the foregoing embodiments, the term "opposite" is used to describe a positional relationship between two parallel element side edges that keep a distance from each other.

The voice coil motor 180 is located above the optical filter 150. The voice coil motor 180 includes a movable member 181, a fixed member 183, and a holding base 185. The movable member 181 is movable axially relative to the fixed member 183. When actuated, the voice coil motor 180 can control the relative positions of the movable member 181 and the fixed member 183.

In some embodiments, the carrying portion 173 of the holder 170 is configured to support the voice coil motor 180. Therefore, when the voice coil motor 180 is actuated, movable member 181 can move axially relative to the optical filter 150. In some embodiments, the voice coil motor 180 is supported by one or more holders 170. In other embodiments, the voice coil motor 180 is disposed on the circuit board 110 through the holding base 185.

The lens 190 is located above the optical filter 150 and is configured to adjust light (namely, the optical image signal) entering the lens from the outside of the portable device, and guide the optical image signal to travel toward the optical filter 150 and the image-capturing element 130. The lens 190 is fixed on the movable member 181. In some embodiments, the lens 190 is provided with an outer screw thread, the movable member 181 is hollow and is provided with an inner screw thread, and the lens 190 is fixed at the movable member 181 through a screw connection between the outer screw thread and the inner screw thread of the movable member 181. Therefore, when the voice coil motor 180 is actuated, the lens 190 can immediately move axially, to change a distance between the lens 190 and the image-capturing element 130, so that the image-capturing assembly 100 has a focusing function.

In some embodiments, a combination of the foregoing optical filter 150 and lens 190 may be plain glass and a lens with an optical coating film. The plain glass does not have a coating film with a light filtering function, and is merely ordinary glass; the lens has a coating film for filtering ultraviolet and infrared light.

A back focal length (BFL) exists from a lower apex of the lens 190 to the upper surface of the image-capturing element 130. The BLF is obtained by measuring when the lens 190 is focused at infinity. By reducing the BLF, the overall height of the image-capturing assembly 100 can be reduced. According to use requirements of different portable devices, image-capturing assemblies 100 of the portable devices have different BFLs. For example, a BLF distance of a camera of a portable phone may be 0.6 to 1 mm.

Refer to FIG. 1A to FIG. 4. In some embodiments, the image-capturing assembly 100 includes a circuit board 110, an image-capturing element 130, an optical filter 150, and a holder 170. The holder 170 includes a fixing portion 171. The image-capturing element 130 is located between the circuit board 110 and the optical filter 150. Moreover, the image-capturing element 130 is located on the circuit board 110 and electrically connected to the circuit board 110. The holder 170 is located on an external side of the image-capturing element 130. The fixing portion 171 has an upper surface and a lower surface opposite to each other, and the lower surface is fixed on the circuit board 110. Moreover, the optical filter 150 is fixed on the upper surface of the fixing portion 171.

Figure 1B:
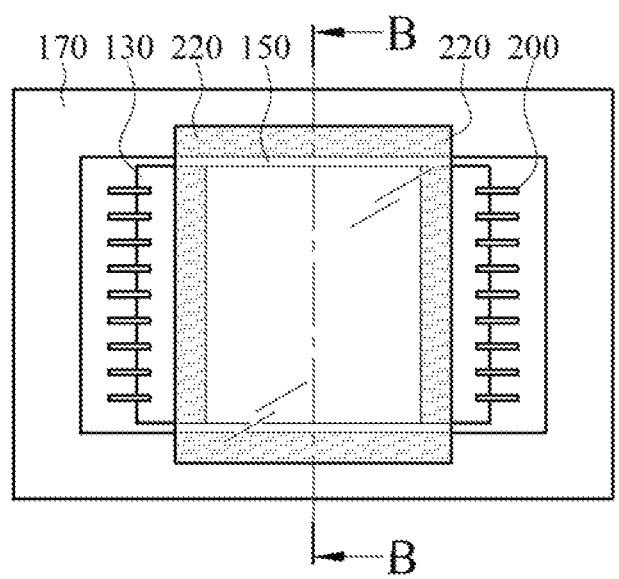
FIG. 1B is a schematic top view of an image-capturing assembly having an annular holder according to another embodiment of the present invention.

FIG. 1A and FIG. 1B are schematic top views of an image-capturing assembly having an annular holder. The holder 170 is an annular element with an opening; the image-capturing element 130 is located in the opening and is electrically connected to the circuit board 110 through a wire 200. In an embodiment, when a lower surface of the optical filter 150 is larger than an upper surface of the image-capturing element 130, the optical filter 150 is fixed on the annular holder 170 through an adhesive layer 220, as shown in FIG. 1A. In another embodiment, when the lower surface of the optical filter 150 is smaller than the upper surface of the image-capturing element 130, two opposite short edges of the optical filter 150 are fixed on the annular holder 170 through the adhesive layer 220, and two opposite long edges of the optical filter 150 are also fixed on an external side of an active area of the image-capturing element 130 through the adhesive layer 220.

In still another embodiment, the adhesive layer 220 may be coated on the external side of the active area of the image-capturing element 130, so that the active area of the image-capturing element 130 is located in an area enclosed by the holder 170, the image-capturing element 130, the optical filter 150, and the adhesive layer 220, thus preventing particles in the air from entering the space between the optical filter 150 and the image-capturing element 130.

Figure 1C:
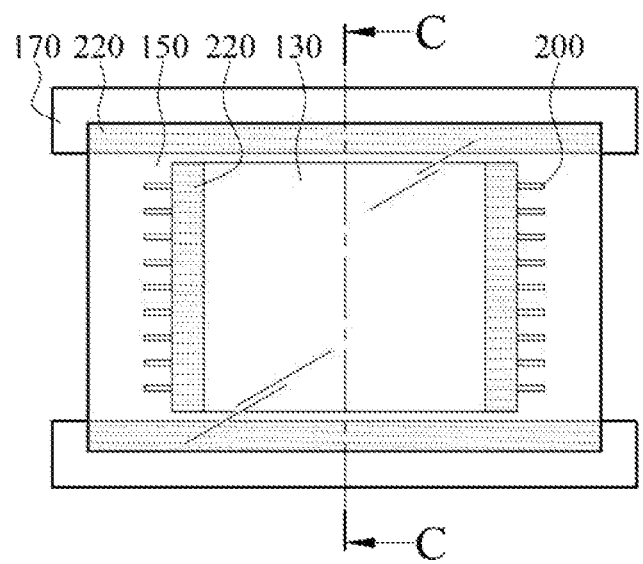
FIG. 1C is a schematic top view of an image-capturing assembly having two strip-shaped holders according to an embodiment of the present invention.
Figure 1D:
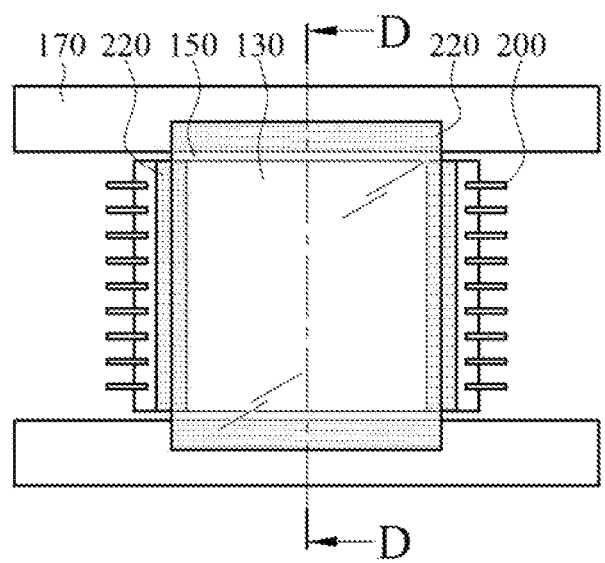
FIG. 1D is a schematic top view of an image-capturing assembly having two strip-shaped holders according to another embodiment of the present invention.

FIG. 1C and FIG. 1D are schematic top views of an image-capturing assembly having two strip-shaped holders. The image-capturing assembly 100 includes two holders 170 and an image-capturing element 130. The image-capturing element 130 has two opposite first side edges and two opposite second side edges. The holders 170 are strip elements located on the two first side edges respectively. In an embodiment, when the lower surface of the optical filter 150 is larger than the upper surface of the image-capturing element 130, two opposite long edges of the optical filter 150 are fixed on the two strip holders 170 through the adhesive layer 220, and two opposite short edges of the optical filter 150 are fixed on the external side of the active area of the image-capturing element 130 through the adhesive layer 220, as shown in FIG. 1C. In another embodiment, when the lower surface of the optical filter 150 is smaller than the upper surface of the image-capturing element 130, two opposite short edges of the optical filter 150 are fixed on the two strip holders 170 through the adhesive layer 220, and two opposite long edges of the optical filter 150 are fixed on the external side of the active area of the image-capturing element 130 through the adhesive layer 220, as shown in FIG. 1D.

Figure 2:
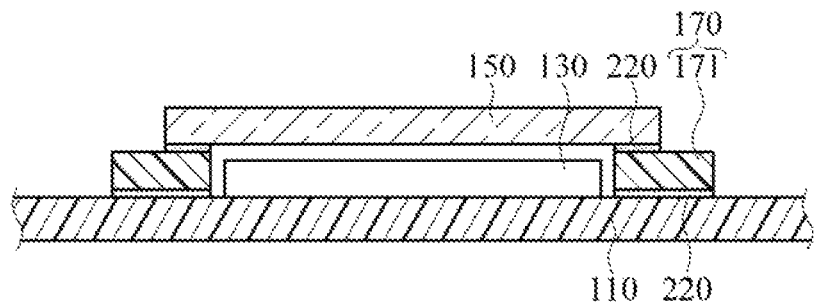
FIG. 2 is a cross-sectional schematic view of an image-capturing assembly taken along a line A-A, B-B, C-C, or D-D according to a first embodiment of the present invention.
Figure 3:
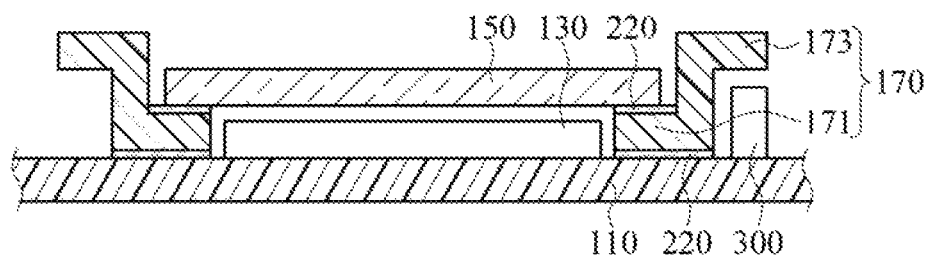
FIG. 3 is a cross-sectional schematic view of an image-capturing assembly taken along a line A-A, B-B, C-C, or D-D according to a second embodiment of the present invention.
Figure 4:
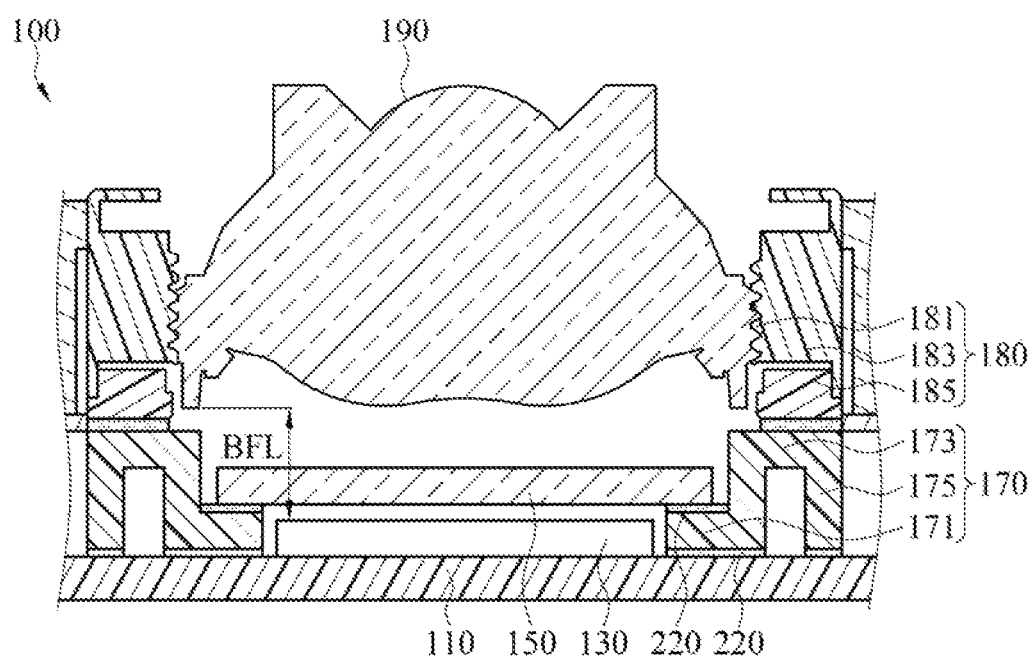
FIG. 4 is a cross-sectional schematic view of an image-capturing assembly taken along a line A-A, B-B, C-C, or D-D according to a third embodiment of the present invention.

Referring to FIG. 2 to FIG. 4 in combination with the lines A-A, B-B, C-C, and D-D in FIG. 1A to FIG. 1D, cross-sections of the image-capturing assembly 100 taken along the lines A-A, B-B, C-C, and D-D may be as shown in the cross-sectional schematic view of any of the first to third embodiments. The image-capturing assembly 100 includes a circuit board 110, an image-capturing element 130, a holder 170, and an optical filter 150. The holder 170 may be annular (as shown in FIG. 1A and FIG. 1B) or strip-shaped (as shown in FIG. 1C and FIG. 1D), and is located on an external side of the image-capturing element 130. The image-capturing element 130 and the holder 170 are both located on the circuit board 110. Therefore, when the optical filter 150 is fixed at a fixing portion 171 of the holder 170, the thickness of the fixing portion 171 is not included between the optical filter 150 and the image-capturing element 130. Therefore, a distance between the optical filter 150 and the image-capturing element 130 is reduced, so that the overall thickness of the image-capturing assembly 100 is reduced.

Referring to FIG. 2, FIG. 2 is a cross-sectional schematic view of an image-capturing assembly taken along a line A-A, B-B, C-C, or D-D according to a first embodiment of the present invention. In the first embodiment, the image-capturing assembly 100 includes a circuit board 110, an image-capturing element 130, an optical filter 150, and a holder 170 having a fixing portion 171. The image-capturing element 130 is located between the circuit board 110 and the optical filter 150. The image-capturing element 130 is located on the circuit board 110 and is electrically connected to the circuit board 110. The holder 170 is located on an external side of the image-capturing element 130 and is disposed on the circuit board 110. The fixing portion 171 has an upper surface and a lower surface opposite to each other. The lower surface of the fixing portion 171 is fixed on the circuit board 110 through an adhesive layer 220, and the optical filter 150 is fixed on the upper surface of the fixing portion 171 through the adhesive layer 220. In addition, the length of the holder 170 may be extended to exceed the side edge of the optical filter 150 (as shown in FIG. 2) or flush with the side edge of the optical filter 150. Moreover, the voice coil motor 180 is disposed on the circuit board 110 through a holding base 185.

Referring to FIG. 3, FIG. 3 is a cross-sectional schematic view of an image-capturing assembly taken along a line A-A, B-B, C-C, or D-D according to a second embodiment of the present invention. In the second embodiment, the image-capturing assembly 100 includes a circuit board 110, an image-capturing element 130, an optical filter 150, and a holder 170 having a fixing portion 171 and a carrying portion 173. The image-capturing element 130 is located between the circuit board 110 and the optical filter 150. The image-capturing element 130 is located on the circuit board 110 and electrically connected to the circuit board 110. The holder 170 is located on an external side of the image-capturing element 130 and is disposed on the circuit board 110. The fixing portion 171 has an upper surface and a lower surface opposite to each other. The lower surface of the fixing portion 171 is fixed on the circuit board 110 through an adhesive layer 220, and the optical filter 150 is fixed on the upper surface of the fixing portion 171 through the adhesive layer 220. The carrying portion 173 has an upper surface and a lower surface, and a space may be further provided between the lower surface of the carrying portion 173 and the circuit board 110 to accommodate an electronic element 300 of the circuit board 110, so as to reduce the overall height and volume of the image-capturing assembly 100. The upper surface of the carrying portion 173 is non-coplanar with the upper surface of the fixing portion 171, as shown in FIG. 3. In another implementation of the second embodiment, the upper surface of the carrying portion 173 is coplanar with the upper surface of the fixing portion 171, that is, an extended region of the holder 170 which exceeds the side edge of the optical filter 150 is the carrying portion 173 configured to carry a voice coil motor 180. A region of the holder 170 which is located under the optical filter 150 is the fixing portion 171 configured for disposition of the optical filter 150.

Referring to FIG. 4, FIG. 4 is a cross-sectional schematic view of an image-capturing assembly taken along a line A-A, B-B, C-C, or D-D according to a third embodiment of the present invention. In the third embodiment, the image-capturing assembly 100 includes a circuit board 110, an image-capturing element 130, an optical filter 150, and a holder 170. The image-capturing element 130 is located between the circuit board 110 and the optical filter 150. The image-capturing element 130 is located on the circuit board 110 and electrically connected to the circuit board 110. The holder 170 is located on an external side of the image-capturing element 130 and is disposed on the circuit board 110. The holder 170 has a fixing portion 171, a carrying portion 173, and a foot portion 175, and is located on the external side of the image-capturing element 130. The fixing portion 171 has an upper surface and a lower surface opposite to each other. The lower surface of the fixing portion 171 is fixed on the circuit board 110 through an adhesive layer 220, and the optical filter 150 is fixed on the upper surface of the fixing portion 171 through the adhesive layer 220. The carrying portion 173 has an upper surface and a lower surface. A space may be further provided between the lower surface of the carrying portion 173 and the circuit board 110 to accommodate an electronic element 300 of the circuit board 110, so as to reduce the overall height and volume of the image-capturing assembly 100. The foot portion 175 is located under the carrying portion 173, and is fixed on the circuit board 110 through the adhesive layer 220, so as to enhance the carrying stability and overall mechanical strength of the holder 170.

Figure 5A:
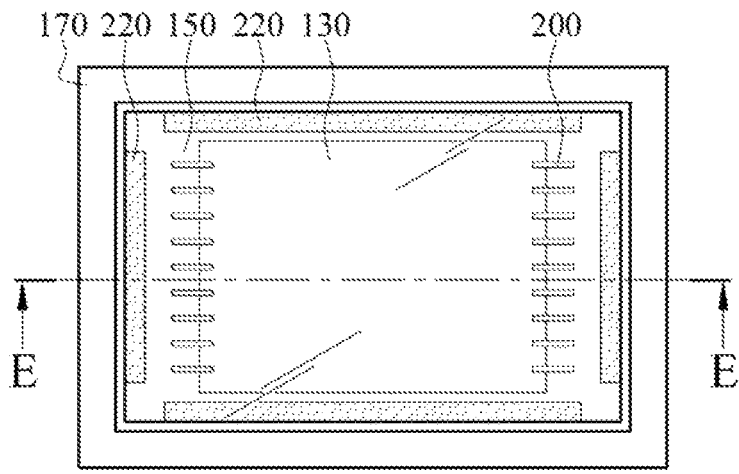
FIG. 5A is a schematic top view of an image-capturing assembly having an annular holder according to an embodiment of the present invention.
Figure 5B:
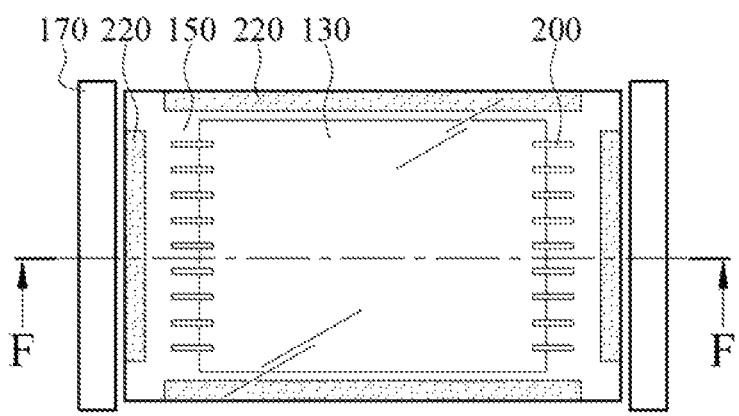
FIG. 5B is a schematic top view of an image-capturing assembly having two strip-shaped holders according to an embodiment of the present invention.

Referring to FIG. 5A and FIG. 5B, FIG. 5A is a schematic top view of an image-capturing assembly 100 having an annular holder 170 according to an embodiment, and FIG. 5B is a schematic top view of an image-capturing assembly 100 having two strip-shaped holders 170 according to an embodiment. In an embodiment, the holder 170 is an annular element with an opening, as shown in FIG. 5A, and surrounds the image-capturing element 130. Moreover, an electrical connection between the image-capturing element 130 and the circuit board 110 is located between the holder 170 and the image-capturing element 130. In another embodiment, the image-capturing element 130 has two opposite first side edges and two opposite second side edges, and the holders 170 are strip elements that are located on the two first side edges respectively, as shown in FIG. 5B.

Referring to FIG. 6, FIG. 6A, and FIG. 7 to FIG. 10 in combination with the line A-A, B-B, C-C, D-D, E-E, or F-F in FIG. 1A to FIG. 1D, FIG. 5A, and FIG. 5B, the cross-section of the image-capturing assembly 100 may be as shown in the cross-sectional schematic view of any of the fourth to ninth embodiments. The image-capturing assembly 100 includes a metal plate 500, a circuit board 110, an image-capturing element 130, a holder 170, and an optical filter 150. The holder 170 may be annular (as shown in FIG. 5A) or strip-shaped (as shown in FIG. 5B), and is located on an external side of the image-capturing element 130. In some embodiments, the circuit board 110 has a hollow portion penetrating the circuit board 110, and the image-capturing element 130 is located in the hollow portion. Both the circuit board 110 and the image-capturing element 130 are fixed on the metal plate 500. Therefore, when the image-capturing element 130 is located in the hollow portion of the circuit board 110, the thickness of the image-capturing assembly 100 does not include the thickness of the image-capturing element 130, thus reducing the overall thickness of the image-capturing assembly 100.

Figure 6:
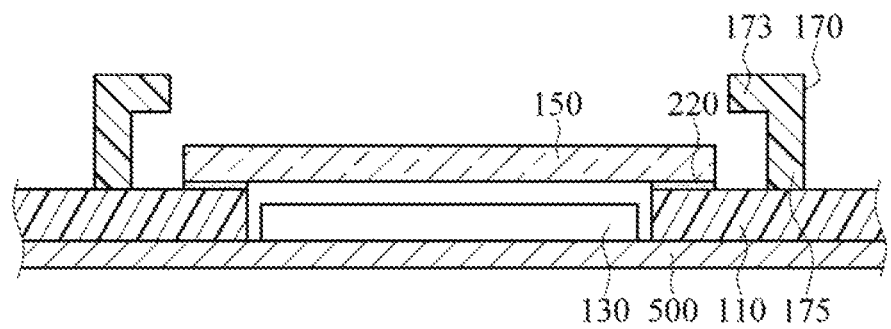
FIG. 6 is a cross-sectional schematic view of an image-capturing assembly taken along a line E-E or F-F according to a fourth embodiment of the present invention.
Figure 6A:
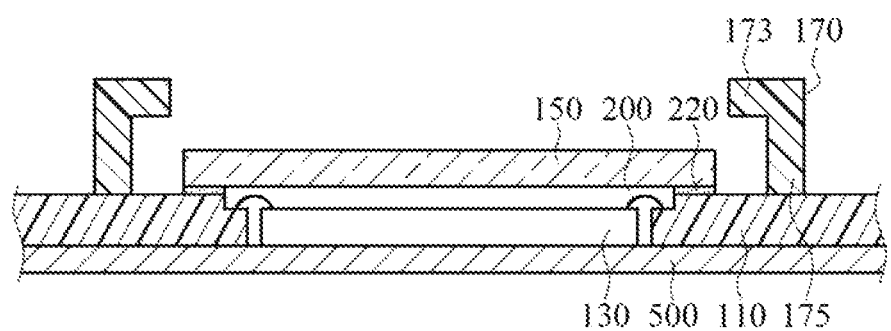
FIG. 6A is a cross-sectional schematic view of an image-capturing assembly according to a fifth embodiment of the present invention.

Referring to FIG. 6 and FIG. 6A, FIG. 6 is a cross-sectional schematic view of an image-capturing assembly taken along a line E-E or F-F according to a fourth embodiment of the present invention, and FIG. 6A is a cross-sectional schematic view of an image-capturing assembly according to a fifth embodiment of the present invention. In the fourth embodiment, the image-capturing assembly 100 includes a metal plate 500, a circuit board 110 having a hollow portion, an image-capturing element 130, a holder 170 having a carrying portion 173 and a foot portion 175, and an optical filter 150. The circuit board 110 is located on the metal plate 500. The image-capturing element 130 is located in the hollow portion and is fixed on the metal plate 500. The optical filter 150 is fixed on the circuit board 110 through an adhesive layer 220. A lower surface of the optical filter 150 is fixed on an upper surface of the adhesive layer 220, and a lower surface of the adhesive layer 220 is fixed on an upper surface of the circuit board 110. Moreover, the foot portion 175 of the holder 170 is located under the carrying portion 173 of the holder 170 and is fixed on the circuit board 110, so as to enhance the carrying stability and overall mechanical strength of the holder 170. In some embodiments, the carrying portion 173 has a first end close to the optical filter 150 and a second end away from the optical filter 150, and is fixed on the circuit board 110 through the foot portion 175 under the first end (as shown in FIG. 6 and FIG. 6A), under second end, or under the first end and the second end, so that a space is provided between the lower surface of the carrying portion 173 and the circuit board 110 to accommodate an electronic element 300 of the circuit board 110, thus reducing the overall height and volume of the image-capturing assembly 100. In the fifth embodiment, the image-capturing assembly 100 further includes an electric connection surface located on an external side of the hollow portion of the circuit board 110, and the image-capturing element 130 is electrically connected, through a wire 200, to the electric connection surface that is non-coplanar with the upper surface of the circuit board 110. The electric connection surface may be located on a plane with a step difference from the upper surface of the circuit board 110, and the electric connection surface is adjacent to a sidewall of the hollow portion, as shown in FIG. 6A. In addition, in other embodiments, the electric connection surface is coplanar with the upper surface of the circuit board 110. The upper surface of the circuit board 110 is another surface of the circuit board 110 which is opposite to the surface connected to the metal plate 500.

Figure 7:
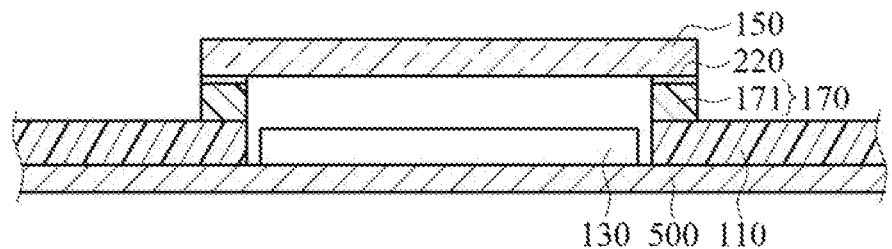
FIG. 7 is a cross-sectional schematic view of an image-capturing assembly taken along a line A-A, B-B, C-C, or D-D according to a sixth embodiment of the present invention.
Figure 8:
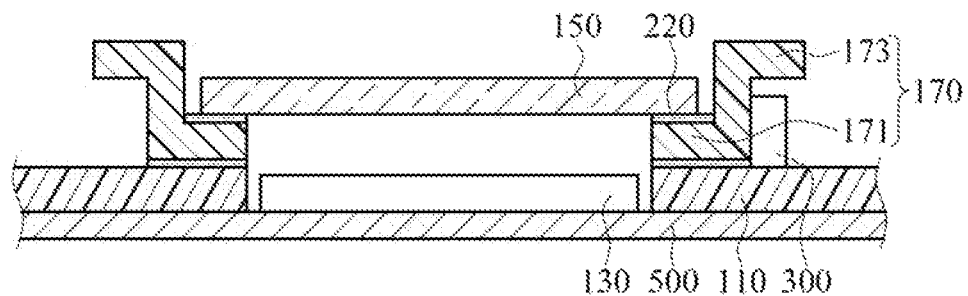
FIG. 8 is a cross-sectional schematic view of an image-capturing assembly taken along a line A-A, B-B, C-C or D-D according to a seventh embodiment of the present invention.
Figure 9:
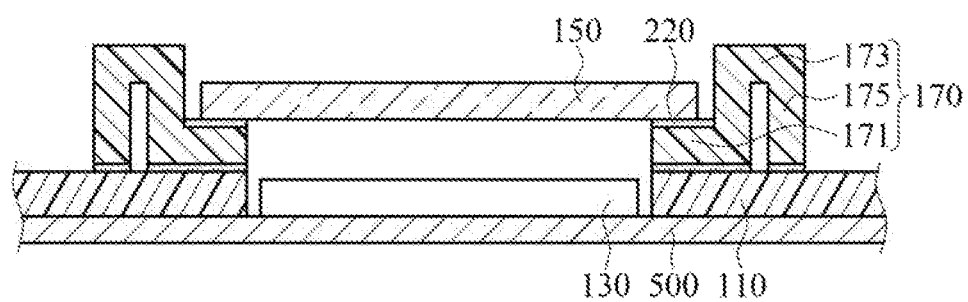
FIG. 9 is a cross-sectional schematic view of an image-capturing assembly taken along a line A-A, B-B, C-C, or D-D according to an eighth embodiment of the present invention.

Referring to FIG. 7 to FIG. 9, FIG. 7 to FIG. 9 are cross-sectional schematic views of an image-capturing assembly taken along a line A-A, B-B, C-C, or D-D according to a sixth embodiment to an eighth embodiment of the present invention. In the sixth embodiment, the image-capturing assembly 100 includes a metal plate 500, a circuit board 110 having a hollow portion, an image-capturing element 130, a holder 170 having a fixing portion 171, and an optical filter 150. The holder 170 is located on an external side of the image-capturing element 130 and is disposed on the circuit board 110. The fixing portion 171 of the holder 170 has an upper surface and a lower surface. The optical filter 150 is fixed on the upper surface of the fixing portion 171 through an adhesive layer 220, and a lower surface of the fixing portion 171 of the holder 170 is fixed on the circuit board 110. In addition, the length of the holder 170 may be extended to exceed the side edge of the optical filter 150 or flush with the side edge of the optical filter 150 (as shown in FIG. 7). Moreover, the voice coil motor 180 is disposed on the circuit board 110 through a holding base 185. In the seventh embodiment, the holder 170 of the image-capturing assembly 100 further includes a carrying portion 173 that has an upper surface and a lower surface. The upper surface of the carrying portion 173 is non-coplanar with the upper surface of the fixing portion 171, and a space may be further provided between the lower surface of the carrying portion 173 and the circuit board 110 to accommodate an electronic element 300 of the circuit board 110, so as to reduce the overall height and volume of the image-capturing assembly 100, as shown in FIG. 8. In another implementation of the seventh embodiment, the upper surface of the carrying portion 173 is co-planar with the upper surface of the fixing portion 171, that is, an extended region of the holder 170 which exceeds the side edge of the optical filter 150 is the carrying portion 173 configured to carry a voice coil motor 180. A region of the holder 170 which is located under the optical filter 150 is the fixing portion 171 configured for disposition of the optical filter 150. In the eighth embodiment, the holder 170 of the image-capturing assembly 100 further includes a carrying portion 173 and a foot portion 175. A space may be further provided between a lower surface of the carrying portion 173 and the circuit board 110 to accommodate an electronic element 300 (not shown in the figure) of the circuit board 110, so as to reduce the overall height and volume of the image-capturing assembly 100. Moreover, the foot portion 175 is located under the carrying portion 173 and is fixed on the circuit board 110 through an adhesive layer 220, so as to increase the carrying stability and overall mechanical strength of the holder 170, as shown in FIG. 9.

Figure 10:
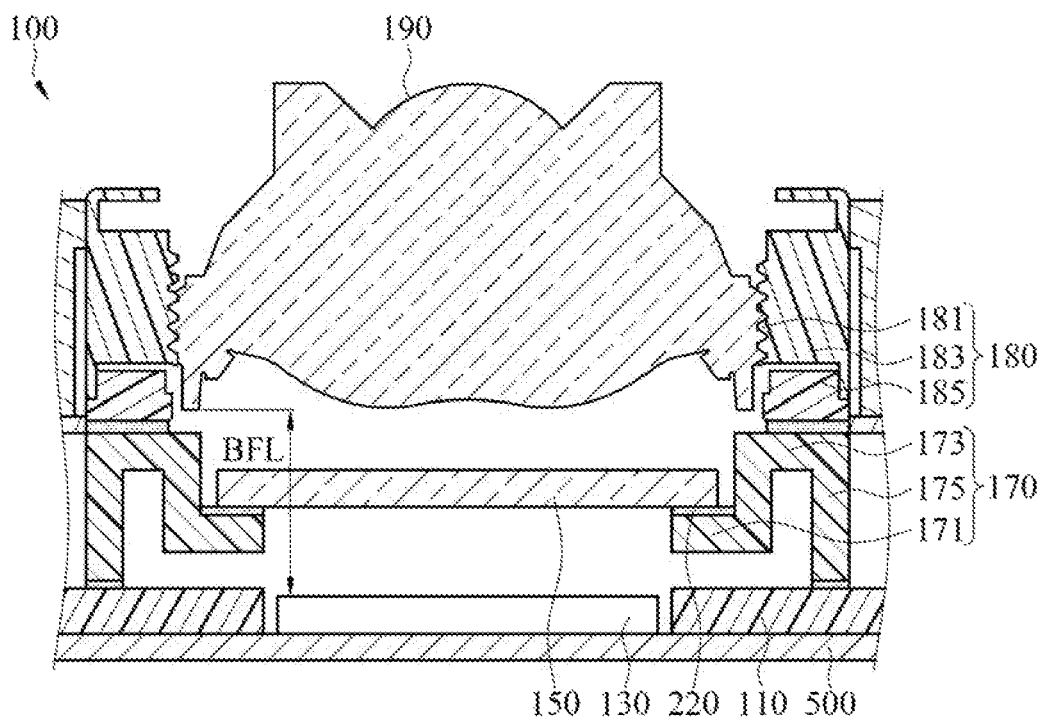
FIG. 10 is a cross-sectional schematic view of an image-capturing assembly taken along a line A-A, B-B, C-C, or D-D according to a ninth embodiment of the present invention.

Referring to FIG. 10, FIG. 10 is a cross-sectional schematic view of an image-capturing assembly taken along a line A-A, B-B, C-C, or D-D according to a ninth embodiment of the present invention. In the ninth embodiment, the image-capturing assembly 100 includes a metal plate 500, a circuit board 110 having a hollow portion, an image-capturing element 130, a holder 170, and an optical filter 150. The holder 170 has a fixing portion 171, a carrying portion 173, and a foot portion 175. The holder 170 is located on an external side of the image-capturing element 130 and is disposed on the circuit board 110. The fixing portion 171 and the carrying portion 173 of the holder 170 each have an upper surface and a lower surface. The optical filter 150 is fixed on the upper surface of the fixing portion 171 through an adhesive layer 220, and the lower surface of the fixing portion 171 of the holder 170 is not fixed on the circuit board 110. A space may be further provided between the lower surface of the carrying portion 173 and the circuit board 110 to accommodate an electronic element 300 (not shown in the figure) of the circuit board 110, so as to reduce the overall height and volume of the image-capturing assembly 100. Moreover, the foot portion 175 is located under the carrying portion 173, and is fixed on circuit board 110 through an adhesive layer 220, so as to increase the carrying stability and overall mechanical strength of the holder 170.

Referring to FIG. 11, FIG. 11A, and FIG. 12 to FIG. 15 in combination with the line A-A, B-B, C-C, D-D, E-E, or F-F in FIG. 1A to FIG. 1D, FIG. 5A and FIG. 5B, the cross-sections of the image-capturing assembly 100 may be as shown in the cross-sectional schematic view of any of the tenth to fifteenth embodiments. The image-capturing assembly 100 includes a circuit board 110 having a recess, an image-capturing element 130, a holder 170, and an optical filter 150. The holder 170 may be annular (as shown in FIG. 5A) or strip-shaped (as shown in FIG. 5B); the holder 170 is located on an external side of the image-capturing element 130 and is disposed on the circuit board 110. In some embodiments, the circuit board 110 has a recess, and the image-capturing element 130 is located between the recess and the optical filter 150. Therefore, when the image-capturing element 130 is located in the recess of the circuit board 110, the thickness of the image-capturing assembly 100 does not include the thickness of the image-capturing element 130, thus reducing the overall thickness of the image-capturing assembly 100.

Figure 11:
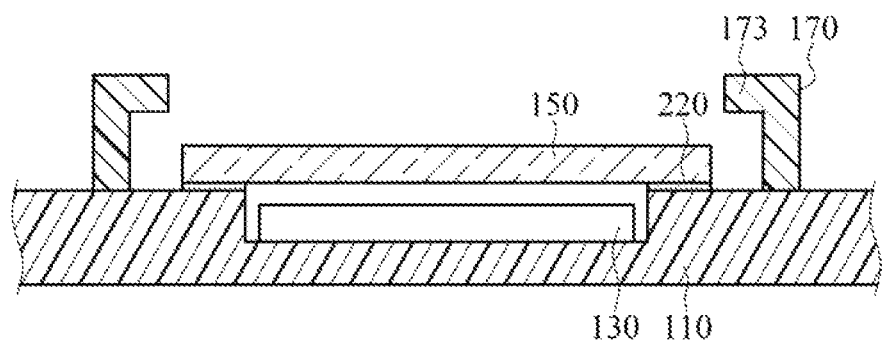
FIG. 11 is a cross-sectional schematic view of an image-capturing assembly taken along a line E-E or F-F according to a tenth embodiment of the present invention.
Figure 11A:
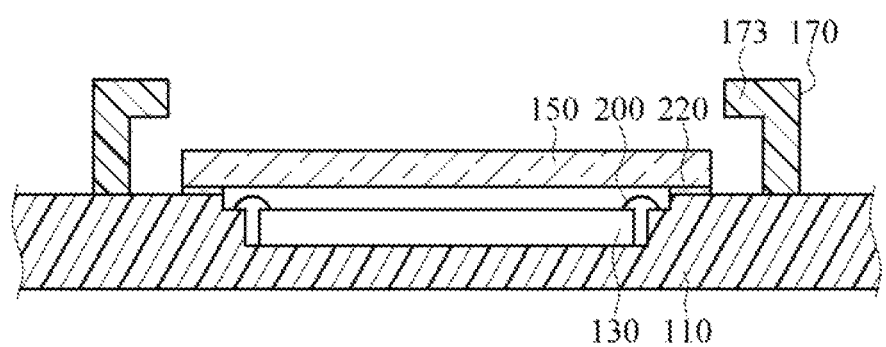
FIG. 11A is a cross-sectional schematic view of an image-capturing assembly according to an eleventh embodiment of the present invention.

Referring to FIG. 11 and FIG. 11A, FIG. 11 is a cross-sectional schematic view of an image-capturing assembly taken along a line E-E or F-F according to a tenth embodiment of the present invention, and FIG. 11A is a cross-sectional schematic view of an image-capturing assembly according to an eleventh embodiment of the present invention. In the tenth embodiment, the image-capturing assembly 100 includes a circuit board 110 having a recess, an image-capturing element 130, a holder 170 having a carrying portion 173 and a foot portion 175, and an optical filter 150. The recess is provided in the circuit board 110 but does not penetrate the circuit board 110. The image-capturing element 130 is located between the recess and the optical filter 150. The optical filter 150 is fixed on the circuit board 110 through an adhesive layer 220. A lower surface of the optical filter 150 is fixed on an upper surface of the adhesive layer 220, and a lower surface of the adhesive layer 220 is fixed on an upper surface of the circuit board 110. In addition, the foot portion 175 of the holder 170 is located under the carrying portion 173 and fixed on the circuit board 110, to enhance the carrying stability and overall mechanical strength of the holder 170. In some embodiments, the carrying portion 173 has a first end close to the optical filter 150 and a second end away from the optical filter 150, and is fixed on the circuit board 110 through the foot portion 175 under the first end (as shown in FIG. 11 and FIG. 11A), under the second end, or under the first end and the second end, so that a space is provided between a lower surface of the carrying portion 173 and the circuit board 110 to accommodate an electronic element 300 of the circuit board 110, thus reducing the overall height and volume of the image-capturing assembly 100. In the eleventh embodiment, the image-capturing assembly 100 further includes an electric connection surface located on an external side of the recess of the circuit board 110, and the image-capturing element 130 is electrically connected to, through a wire 200, the electric connection surface that is non-coplanar with the upper surface of the circuit board 110. The electric connection surface may be located in a plane with a step difference from the upper surface of the circuit board 110, and the electric connection surface is adjacent to a sidewall of the recess. In addition, in other embodiments, the electric connection surface is coplanar with the upper surface of the circuit board 110. The upper surface of the circuit board 110 is another surface of the circuit board 110 which is opposite to a surface without the recess.

Figure 12:
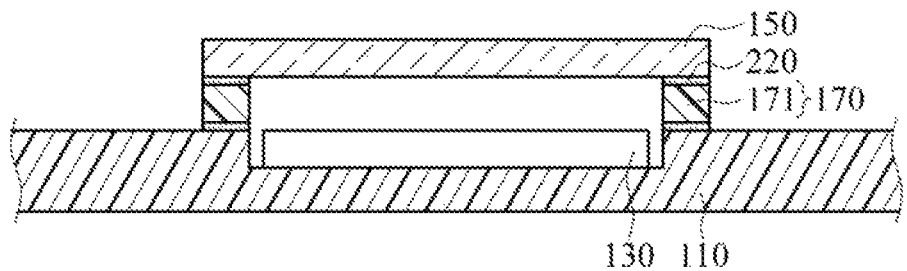
FIG. 12 is a cross-sectional schematic view of an image-capturing assembly taken along a line A-A, B-B, C-C, or D-D according to a twelfth embodiment of the present invention.
Figure 13:
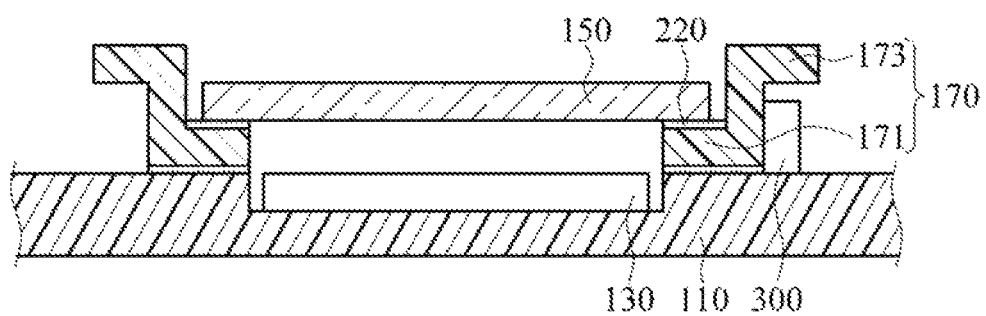
FIG. 13 is a cross-sectional schematic view of an image-capturing assembly taken along a line A-A, B-B, C-C, or D-D according to a thirteenth embodiment of the present invention.
Figure 14:
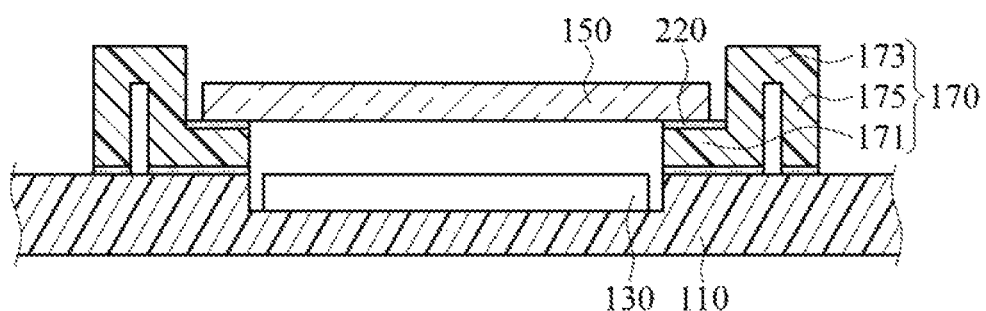
FIG. 14 is a cross-sectional schematic view of an image-capturing assembly taken along a line A-A, B-B, C-C, or D-D according to a fourteenth embodiment of the present invention.

Referring to FIG. 12 to FIG. 14, FIG. 12 to FIG. 14 are cross-sectional schematic views of an image-capturing assembly taken along a line A-A, B-B, C-C, or D-D according to a twelfth embodiment to a fourteenth embodiment of the present invention. In the twelfth embodiment, the image-capturing assembly 100 includes a circuit board 110 having a recess, an image-capturing element 130, a holder 170 having a fixing portion 171, and an optical filter 150. The image-capturing element 130 is located between the recess and the optical filter 150 and is fixed on the circuit board 110. The holder 170 is located on an external side of the image-capturing element 130 and is disposed on the circuit board 110, and the fixing portion 171 of the holder 170 has an upper surface and a lower surface. The optical filter 150 is fixed on the upper surface of the fixing portion 171 through an adhesive layer 220, and the lower surface of the fixing portion 171 of the holder 170 is fixed on the circuit board 110. In addition, the length of the holder 170 may be extended to exceed the side edge of the optical filter 150 or flush with the side edge of the optical filter 150 (as shown in FIG. 12). Moreover, a voice coil motor 180 is disposed on the circuit board 110 through a holding base 185. In the thirteenth embodiment, the holder 170 of the image-capturing assembly 100 further includes a carrying portion 173 that has an upper surface and a lower surface. The upper surface of the carrying portion 173 is non-coplanar with the upper surface of the fixing portion 171, as shown in FIG. 13. In addition, a space may be further provided between the lower surface of the carrying portion 173 and the circuit board 110 to accommodate an electronic element 300 of the circuit board 110 (not shown in the figure), so as to reduce the overall height and the volume of the image-capturing assembly 100. In another implementation of the thirteenth embodiment, the upper surface of the carrying portion 173 is coplanar with the upper surface of the fixing portion 171. That is, an extended region of the holder 170 which exceeds the side edge of the optical filter 150 is the carrying portion 173 configured to carry a voice coil motor 180. A region of the holder 170 which is located under the optical filter 150 is the fixing portion 171 configured for disposition of the optical filter 150. In the fourteenth embodiment, the holder 170 of the image-capturing assembly 100 further includes a carrying portion 173 and a foot portion 175. The foot portion 175 is located under the carrying portion 173 and is fixed on the circuit board 110 through an adhesive layer 220, so as to enhance the carrying stability and overall mechanical strength of the holder 170, as shown in FIG. 14.

Figure 15:
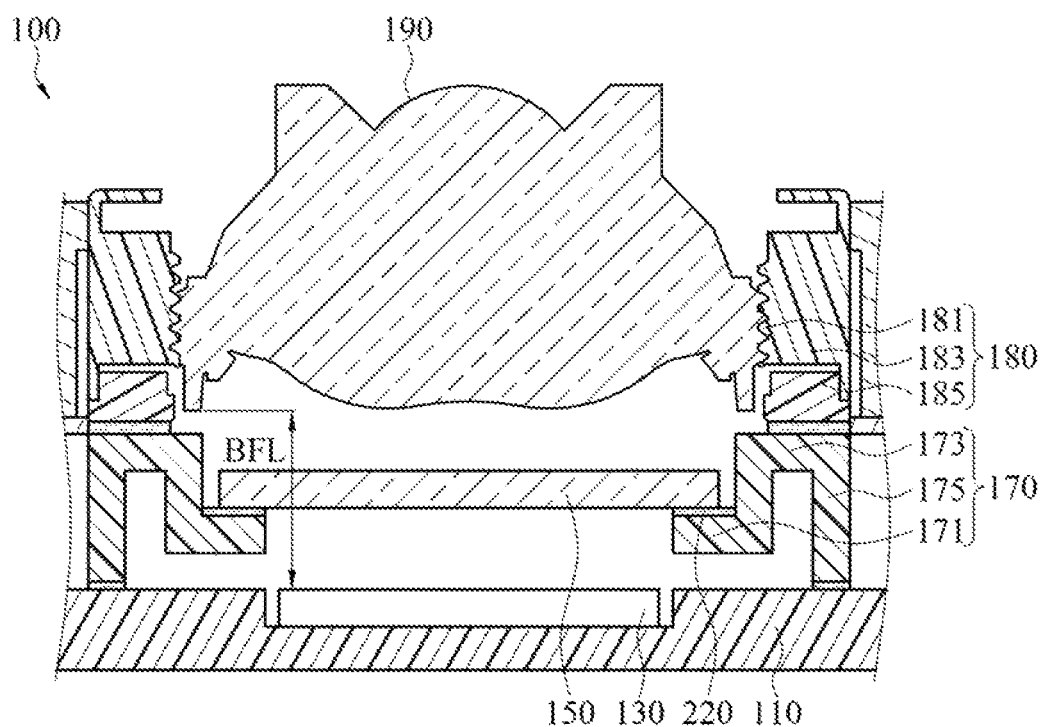
FIG. 15 is a cross-sectional schematic view of an image-capturing assembly taken along a line A-A, B-B, C-C, or D-D according to a fifteenth embodiment of the present invention.
Figure 16A:
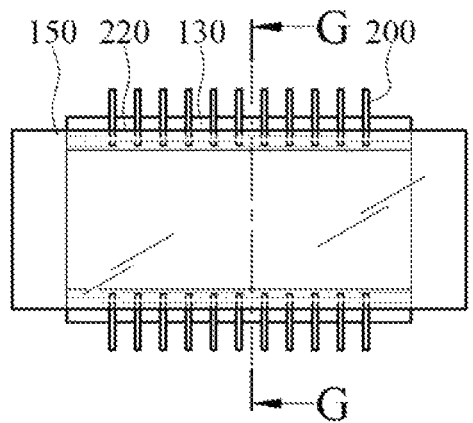
FIG. 16A is a schematic top view of an image-capturing assembly according to a sixteenth embodiment of the present invention.
Figure 16B:
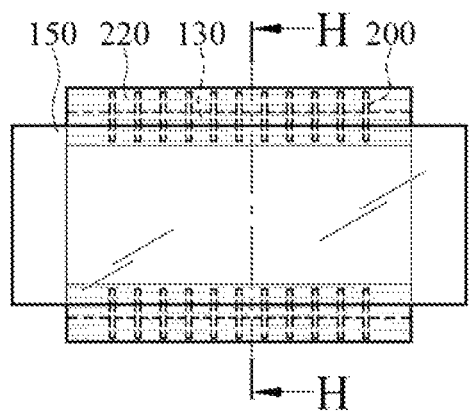
FIG. 16B is a schematic top view of an image-capturing assembly an eighteenth embodiment of the present invention.
Figure 16C:
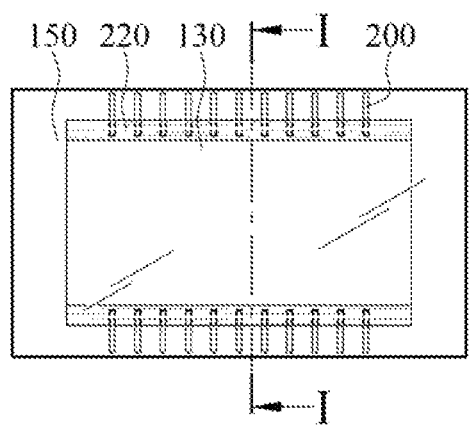
FIG. 16C is a schematic top view of an image-capturing assembly according to a nineteenth embodiment of the present invention.
Figure 16D:
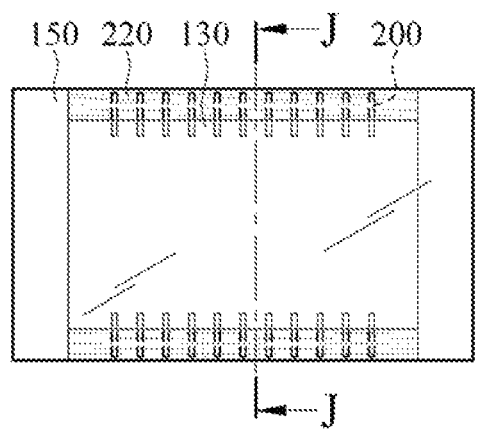
FIG. 16D is a schematic top view of an image-capturing assembly according to a twentieth embodiment of the present invention.
Figure 16E:
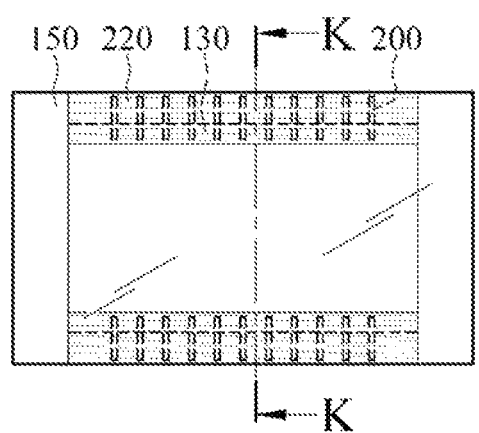
FIG. 16E is a schematic top view of an image-capturing assembly according to a twenty-first embodiment of the present invention.

Referring to FIG. 15, FIG. 15 is a cross-sectional schematic view of an image-capturing assembly taken along a line A-A, B-B, C-C, or D-D according to a fifteenth embodiment of the present invention. In the fifteenth embodiment, the image-capturing assembly 100 includes a circuit board 110 having a recess, an image-capturing element 130, a holder 170, and an optical filter 150. The image-capturing element 130 is located between the recess and the optical filter 150, and is fixed on the circuit board 110. The holder 170 has a fixing portion 171, a carrying portion 173, and a foot portion 175. The holder 170 is located on an external side of the image-capturing element 130 and is disposed on the circuit board 110. The fixing portion 171 and the carrying portion 173 of the holder 170 each have an upper surface and a lower surface. A space may be further provided between the lower surface of the carrying portion 173 and the circuit board 110 to accommodate an electronic element 300 (not shown in the figure) of the circuit board 110, so as to reduce the overall height and volume of the image-capturing assembly 10. The optical filter 150 is fixed on the upper surface of the fixing portion 171 through an adhesive layer 220, and the lower surface of the fixing portion 171 of the holder 170 is not fixed on the circuit board 110. Moreover, the foot portion 175 is located under the carrying portion 173 and is fixed on the circuit board 110 through the adhesive layer 220, so as to enhance the carrying stability and overall mechanical strength of the holder 170.

FIG. 16A to FIG. 16E are schematic top views of an image-capturing assembly of the present invention. Referring to FIG. 16A to FIG. 16E in combination with FIG. 17 and FIG. 18 to FIG. 21, FIG. 17 and FIG. 18 to FIG. 21 are cross-sectional schematic views of an image-capturing assembly taken along lines G-G, H-H, I-I, J-J, and K-K corresponding to FIG. 16A to FIG. 16E. The image-capturing assembly 100 includes a circuit board 110, an image-capturing element 130 having an active area, a first adhesive layer 220, and an optical filter 150. The image-capturing element 130 is located on the circuit board 110. The first adhesive layer 220 is located on an external side of the active area of the image-capturing element 130. The optical filter 150 has an upper surface and a lower surface, and is located above the image-capturing element 130. The lower surface of the optical filter 150 is fixed on the first adhesive layer 220. In some embodiments, the external side of the active area of the image-capturing element 130 includes a non-active area on the image-capturing element 130 corresponding to the active area, an external sidewall of the image-capturing element 130, and the circuit board on the external side of the image-capturing element 130, and any item in the foregoing combination. The non-active area is the upper surface of the image-capturing element 130 except the active area. For example, the first adhesive layer 220 is disposed in the non-active area of the image-capturing element 130 (referring to FIG. 17, FIG. 17A, and FIG. 19); the first adhesive layer 220 is disposed on the circuit board 110 on the external side of the image-capturing element 130, that is, the first adhesive layer 220 is located on the circuit board 110 and wraps or is in contact with at least one external sidewall (referring to FIG. 20) of the image-capturing element 130; alternatively, the first adhesive layer 220 is disposed on the circuit board 110 on the external side of the image-capturing element 130 and in the non-active area of the circuit board 110, that is, the first adhesive layer 220 is located in the non-active area of the image-capturing element 130 and on the circuit board 110, and wraps or is in contact with at least one external sidewall (referring to FIG. 18 and FIG. 21) of the image-capturing element 130. Therefore, when the optical filter 150 is disposed above the image-capturing element 130 through the first adhesive layer 220, a distance equal to the thickness of the first adhesive layer 220 can be maintained between the optical filter 150 and the image-capturing element 130, or the optical filter 150 is close to the image-capturing element 130. Therefore, the distance between the optical filter 150 and the image-capturing element 130 is reduced, so that the overall thickness of the image-capturing assembly 100 is reduced.

Figure 17:
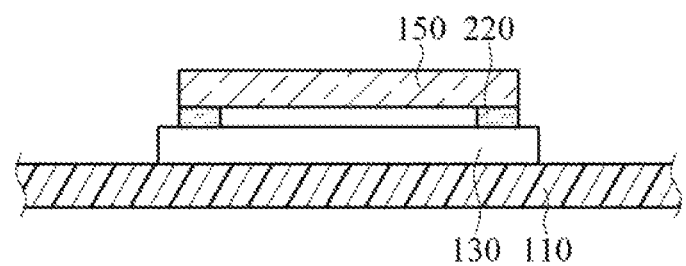
FIG. 17 is a cross-sectional schematic view of the image-capturing assembly taken along a line G-G according to the sixteenth embodiment of the present invention.
Figure 17A:
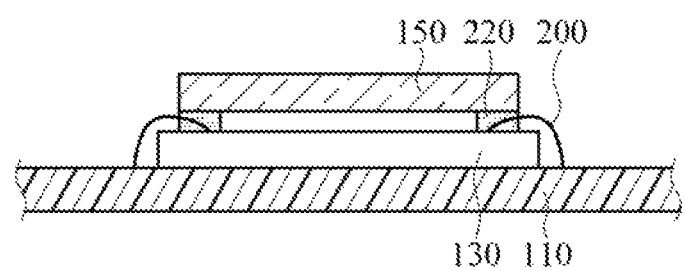
FIG. 17A is a cross-sectional schematic view of the image-capturing assembly according to a seventeenth embodiment of the present invention.

Referring to FIG. 17 and FIG. 17A, FIG. 17 is a cross-sectional schematic view of the image-capturing assembly taken along a line G-G according to the sixteenth embodiment of the present invention, and FIG. 17A is a cross-sectional schematic view of the image-capturing assembly according to the seventeenth embodiment of the present invention. In the sixteenth embodiment, the image-capturing assembly 100 includes a circuit board 110, an image-capturing element 130 having an active area, a first adhesive layer 220, and an optical filter 150. Two opposite edges of a lower surface of the optical filter 150 are smaller than or equal to two opposite edges of an upper surface of the corresponding image-capturing element 130. The image-capturing element 130 is located on the circuit board 110, the first adhesive layer 220 is located on the upper surface of the image-capturing element 130, and the upper surface is a non-active area of the image-capturing element 130. In other words, a lower surface of the first adhesive layer 220 is in contact with the upper surface of the image-capturing element 130. The optical filter 150 has an upper surface and a lower surface, and is located above the image-capturing element 130. The lower surface of the optical filter 150 is fixed on the first adhesive layer 220, that is, the optical filter 150 is fixed above the image-capturing element 130 through the first adhesive layer 220. It is to be particularly noted that, the optical filter 150 needs to be disposed corresponding to the active area of the image-capturing element 130, to maintain good optical and imaging quality. In the seventeenth embodiment, the image-capturing assembly 100 further includes a wire 200, and the image-capturing element 130 is electrically connected to the circuit board 110 through the wire 200.

Figure 18:
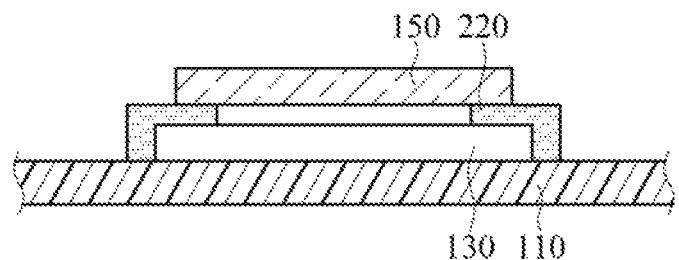
FIG. 18 is a cross-sectional schematic view of the image-capturing assembly taken along a line H-H according to the eighteenth embodiment of the present invention.

Referring to FIG. 18, FIG. 18 is a cross-sectional schematic view of the image-capturing assembly taken along a line H-H according to the eighteenth embodiment of the present invention. In the eighteenth embodiment, the image-capturing assembly 100 includes a circuit board 110, an image-capturing element 130 having an active area, a first adhesive layer 220, and an optical filter 150. Two opposite edges of a lower surface of the optical filter 150 are smaller than or equal to two opposite edges of an upper surface of the corresponding image-capturing element 130. The image-capturing element 130 is located on the circuit board 110. The first adhesive layer 220 is disposed on an external side of the image-capturing element 130 and an external side of the active area of the image-capturing element 130. That is, the first adhesive layer 220 is located in the non-active area of the image-capturing element 130 and on the circuit board 110. A lower surface of the first adhesive layer 220 is in contact with the non-active area of the upper surface of the image-capturing element 130 and the circuit board 110, and wraps or is in contact with at least one external sidewall of the image-capturing element 130. Moreover, the optical filter 150 is fixed above the image-capturing element 130 through the first adhesive layer 220. It is to be particularly noted that, the optical filter 150 needs to be disposed corresponding to the active area of the image-capturing element 130, to maintain good optical and imaging quality.

Figure 19:
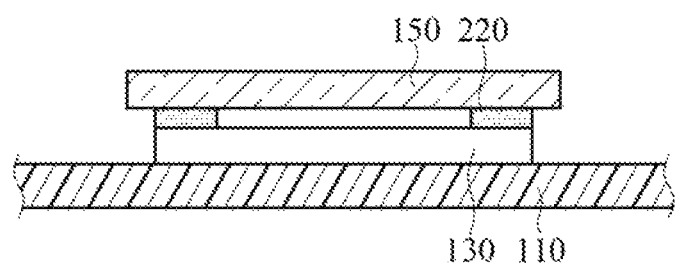
FIG. 19 is a cross-sectional schematic view of the image-capturing assembly taken along a line I-I according to the nineteenth embodiment of the present invention.
Figure 20:
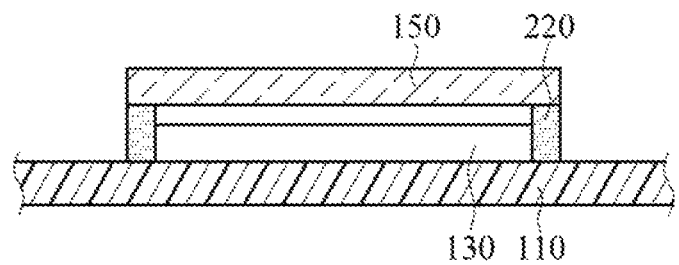
FIG. 20 is a cross-sectional schematic view of the image-capturing assembly taken along a line J-J according to the twentieth embodiment of the present invention.
Figure 21:
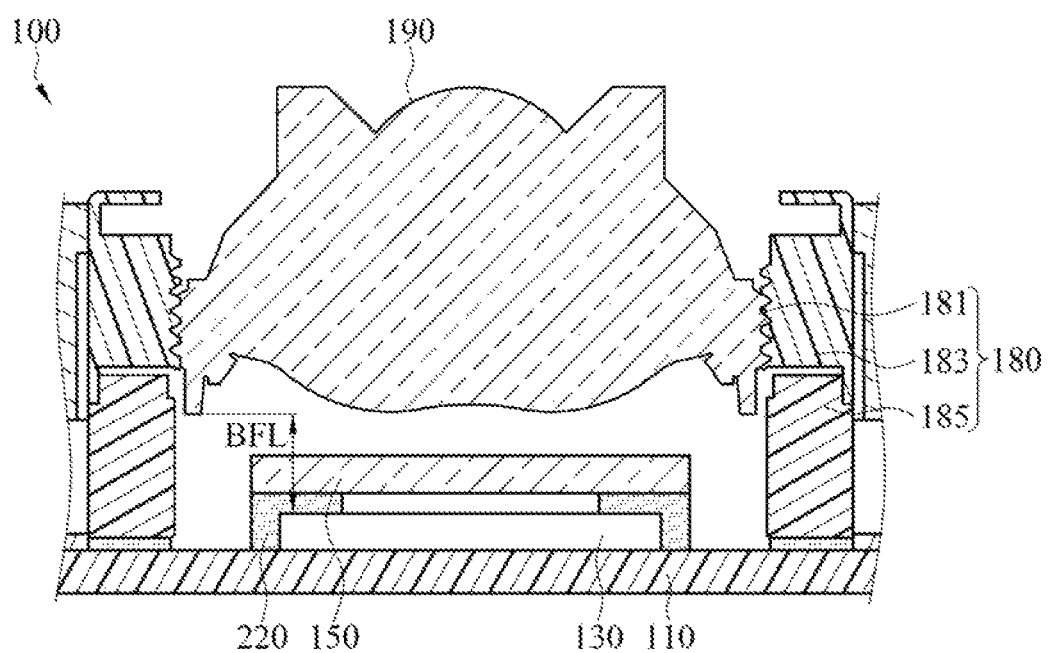
FIG. 21 is a cross-sectional schematic view of the image-capturing assembly taken along a line K-K according to the twenty-first embodiment of the present invention.

Referring to FIG. 19 to FIG. 21, FIG. 19 to FIG. 21 are cross-sectional schematic views of the image-capturing assembly taken along a line I-I, J-J, or K-K according to the nineteenth embodiment to the twenty-first embodiment of the present invention. The image-capturing assembly 100 includes a circuit board 110, an image-capturing element 130 having an active area, a first adhesive layer 220, and an optical filter 150. Two opposite edges of a lower surface of the optical filter 150 are larger than two opposite edges of an upper surface of the corresponding image-capturing element 130. That is, the optical filter 150 is larger in size than the image-capturing element 130, and is disposed corresponding to the active area of the image-capturing element 130. Therefore, it can prevent light leakage at the edge of the optical filter 150, so that noise does not enter the active area of the image-capturing element 130 to affect processing of the optical image signal and cause undesirable imaging quality. The image-capturing element 130 is located on the circuit board 110. The optical filter 150 is disposed above the image-capturing element 130 through the first adhesive layer 220. In the nineteenth embodiment, the first adhesive layer 220 is located on an upper surface of the image-capturing element 130, and the upper surface is a non-active area of the image-capturing element 130. In other words, a lower surface of the first adhesive layer 220 is in contact with the non-active area of the upper surface of the image-capturing element 130. In the twentieth embodiment, the first adhesive layer 220 is disposed on the circuit board 110 on an external side of the image-capturing element 130, that is, the lower surface of the first adhesive layer 220 is in contact with the circuit board 110, and the first adhesive layer 220 wraps or is in contact with at least one external sidewall of the image-capturing element 130. Therefore, the optical filter 150 is fixed on the first adhesive layer 220, so that the optical filter 150 is located above the image-capturing element 130. In the twenty-first embodiment, the first adhesive layer 220 is disposed in the non-active area of the image-capturing element 130 and on the circuit board 110, that is, the lower surface of the first adhesive layer 220 is in contact with the non-active area of the upper surface of the image-capturing element 130 and the circuit board 110, and the first adhesive layer 220 wraps or is in contact with at least one external sidewall of the image-capturing element 130. Moreover, the optical filter 150 is fixed above the image-capturing element 130 through the first adhesive layer 220.

Figure 22:
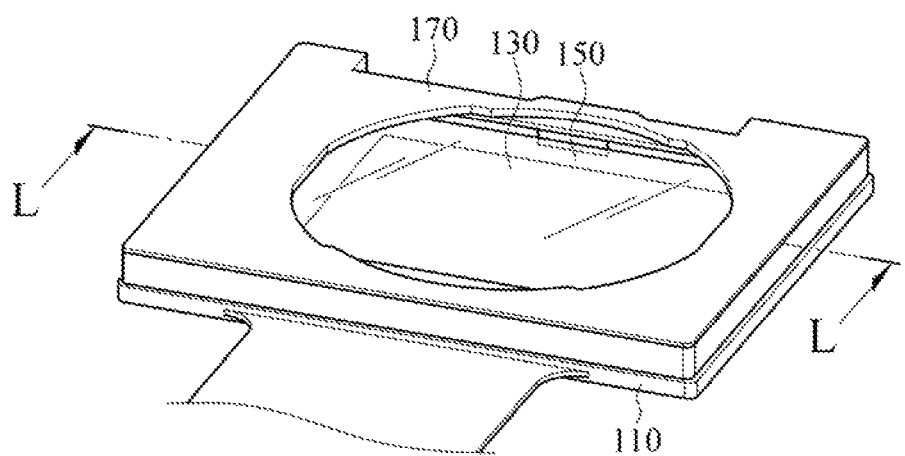
FIG. 22 is a schematic top view of an image-capturing assembly according to an embodiment of the present invention.
Figure 23:
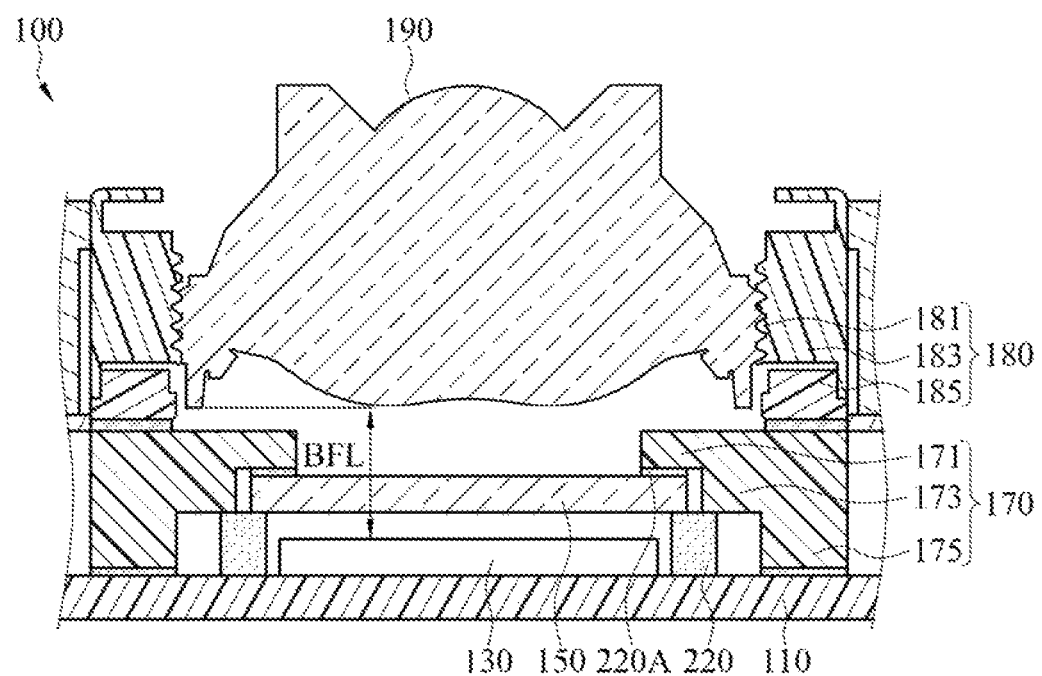
FIG. 23 is a cross-sectional schematic view of an image-capturing assembly taken along a line L-L according to a twenty-second embodiment of the present invention.

Referring to FIG. 22 in combination with FIG. 23, FIG. 22 is a schematic top view of an image-capturing assembly according to an embodiment of the present invention, and FIG. 23 is a cross-sectional schematic view of an image-capturing assembly taken along a line L-L according to a twenty-second embodiment of the present invention. In the twenty-second embodiment, the image-capturing assembly 100 includes a circuit board 110, an image-capturing element 130 having an active area, a first adhesive layer 220, a second adhesive layer 220A, an optical filter 150, and a holder 170. The image-capturing element 130 and the holder 170 are located on the circuit board 110. The holder 170 has an opening, and surrounds an external side of the active area of the image-capturing element 130. The holder 170 has a fixing portion 171 with a lower surface. The first adhesive layer 220 is located on the circuit board 110 on an external side of the image-capturing element 130, and a lower surface of the first adhesive layer 220 is in contact with the circuit board 110. A lower surface of the optical filter 150 is fixed on the first adhesive layer 220, and an upper surface of the optical filter 150 is fixed on the lower surface of the fixing portion 171 through the second adhesive layer 220A. In some embodiments, the holder 170 further includes a carrying portion 173 and a foot portion 175, and is located on the external side of the image-capturing element 130. The carrying portion 173 has an upper surface and a lower surface. The foot portion 175 is located under the carrying portion 173, and is fixed on the circuit board 110 through the adhesive layer 220, to enhance the carrying stability and overall mechanical strength of the holder 170. In another implementation of the twenty-second embodiment, the first adhesive layer 220 may further wrap or be in contact with at least one external sidewall of the image-capturing element 130.

Moreover, the shape of the opening may be, but is not limited to, a circle or a square. For example, the holder 170 with the opening is inverted to help fix the optical filter 150. After the optical filter 150 is fixed through the second adhesive layer 220A, the holder 170 and the optical filter 150 are aligned with the position of the image-capturing element 130, and the optical filter 150 is disposed above the image-capturing element 130 through the first adhesive layer 220, thus enhancing the stability and mechanical reliability of the optical filter 150.

In addition, in some embodiments, the image-capturing assembly 100 further includes a voice coil motor 180 and a lens 190. The voice coil motor 180 is fixed on the upper surface of the carrying portion 173 of the holder 170 (as shown in FIG. 4, FIG. 10, FIG. 15, and FIG. 23, but the implementation is not limited to the foregoing figures, and the foregoing figures are merely examples) or fixed on the circuit board 110 (as shown in FIG. 21, but the implementation is not limited to the foregoing figure, and the foregoing figure is merely an example). For example, in usage, the upper surface of the fixing portion 171 and the upper surface of the carrying portion 173 may be designed to be coplanar or non-coplanar according to a device to which the image-capturing assembly 100 is applied. In other embodiments, the electronic element 300 is located between the circuit board 110 and the carrying portion 173, so as to reduce the overall height and volume of the image-capturing assembly 100, as shown in FIG. 3.

In some embodiments, the image-capturing element 130 is electrically connected to the circuit board 110 through the wire 200 (as shown in FIG. 6A, FIG. 11A, and FIG. 17A, but the implementation is not limited to the foregoing figures, and the foregoing figures are merely examples). In some embodiments, the first adhesive layer 220 or the adhesive layer 220 may wrap one end of the wire 200 (as shown in FIG. 17A, but the implementation is not limited to the foregoing figure, and the foregoing figure is merely an example) or the entire wire 200 (not shown in the figure), to provide mechanical strength and stabilize a welding point of the electrical connection between the wire and the circuit board, so as to enhance the reliability of the structure.

In conclusion, in the image-capturing assembly 100 provided according to the embodiments of the present invention, placement positions or fixing manners of the image-capturing element 130, the optical filter 150, the holder 170 and other elements are changed, so that the distance between the optical filter 150 and the image-capturing element 130 is reduced, thus reducing the overall thickness of the image-capturing assembly 100. In this way, the objective of making a portable device thin and light is achieved.

In addition, the shapes, sizes, and ratios of elements in the figures as well as arrangement of elements and a relative distance between elements shown in the drawings are merely examples. The positions or sequence of the elements may be adjusted or the elements may coexist. The drawings are provided to allow a person of ordinary skill in the art to understand the present invention, but are not intended to limit the implementation scope of the present invention.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An image-capturing assembly, comprising:
   a circuit board;
   an image-capturing element, having an active area and on the circuit board;
   a first adhesive layer on an external side of the active area of the image-capturing element, wherein the first adhesive layer is on a non-active area of the image-capturing element and on the circuit board; and
   an optical filter, having an upper surface and a lower surface and above the image-capturing element, the lower surface being fixed on the first adhesive layer.

2. The image-capturing assembly according to claim 1, further comprising:
   a voice coil motor fixed on the circuit board; and
   a lens fixed on the voice coil motor.

3. The image-capturing assembly according to claim 1, further comprising:
   a wire, the image-capturing element being electrically connected to the circuit board through the wire;
   wherein the first adhesive layer wraps one end of the wire or the whole wire.

4. The image-capturing assembly according to claim 1, wherein the first adhesive layer wraps at least one external sidewall of the image-capturing element.

* * * * *